United States Patent
Urano et al.

(10) Patent No.: US 9,543,559 B2
(45) Date of Patent: Jan. 10, 2017

(54) SQUARE SECONDARY BATTERY

(75) Inventors: Kazuaki Urano, Hitachinaka (JP);
Yoshikazu Noiri, Hitachinaka (JP);
Masafumi Shiwa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 157 days.

(21) Appl. No.: 14/419,335

(22) PCT Filed: Aug. 28, 2012

(86) PCT No.: PCT/JP2012/071629
§ 371 (c)(1),
(2), (4) Date: Feb. 3, 2015

(87) PCT Pub. No.: WO2014/033822
PCT Pub. Date: Mar. 6, 2014

(65) Prior Publication Data
US 2015/0194651 A1 Jul. 9, 2015

(51) Int. Cl.
*H01M 2/08* (2006.01)
*H01M 2/12* (2006.01)
*H01M 2/36* (2006.01)
*H01M 2/02* (2006.01)

(52) U.S. Cl.
CPC ............ *H01M 2/1264* (2013.01); *H01M 2/365* (2013.01); *H01M 2/0217* (2013.01); *H01M 2220/20* (2013.01)

(58) Field of Classification Search
CPC combination set(s) only.
See application file for complete search history.

(56) References Cited

U.S. PATENT DOCUMENTS

| 3,617,386 A | * | 11/1971 | Bosben | H01M 2/0421 |
| | | | | 429/206 |
| 3,909,302 A | * | 9/1975 | Mermelstein | H01M 2/367 |
| | | | | 429/86 |
| 5,362,577 A | * | 11/1994 | Pedicini | H01M 2/06 |
| | | | | 429/403 |

(Continued)

FOREIGN PATENT DOCUMENTS

| JP | 2008-034168 A | 2/2008 |
| JP | 2011-034761 A | 2/2011 |

(Continued)

*Primary Examiner* — Kaity Handal
(74) *Attorney, Agent, or Firm* — Volpe and Koenig, P.C.

(57) ABSTRACT

A square secondary battery suppresses welding failure from occurring by temporarily retaining and securing a sealing cover and enabling detection by a leakage test even when welding failure occurs. The square secondary battery has a case surface portion with an injection opening for injecting an electrolyte, a sealing cover disposed at a position opposite to the case surface portion and sealing the injection opening and having an outer edge welded to the case surface portion to seal the injection opening, and a pressure sensitive adhesive member interposed between the sealing cover and the case surface portion for securing the sealing cover to the case surface portion. A gas passage is provided between the case surface portion and the sealing cover for communicating a gap formed at a position outer to the pressure sensitive adhesive member with respect to a battery case and the injection opening in a ventilation manner.

4 Claims, 11 Drawing Sheets

(56) References Cited

U.S. PATENT DOCUMENTS

| | | | | |
|---|---|---|---|---|
| 5,506,067 A * | 4/1996 | Tinker | H01M 2/12 |
| | | | 429/407 |
| 5,702,576 A * | 12/1997 | Kiesele | G01N 27/4045 |
| | | | 204/415 |
| 5,976,731 A * | 11/1999 | Negoro | H01M 4/485 |
| | | | 429/328 |
| 8,088,113 B2 * | 1/2012 | Scherson | A61H 35/00 |
| | | | 604/305 |
| 9,257,686 B2 * | 2/2016 | Kim | H01M 2/06 |
| 2004/0115521 A1 * | 6/2004 | Cho | H01M 2/0404 |
| | | | 429/72 |
| 2006/0073375 A1 * | 4/2006 | Hong | H01M 2/1223 |
| | | | 429/53 |
| 2006/0078787 A1 * | 4/2006 | Sato | H01M 2/0413 |
| | | | 429/62 |
| 2006/0099504 A1 * | 5/2006 | Kim | H01M 2/0275 |
| | | | 429/176 |
| 2012/0301786 A1 * | 11/2012 | Takamuku | B60L 11/1879 |
| | | | 429/223 |

FOREIGN PATENT DOCUMENTS

| | | |
|---|---|---|
| JP | 2012-069288 A | 4/2012 |
| JP | 2012-069298 A | 4/2012 |

* cited by examiner

SQUARE SECONDARY BATTERY

TECHNICAL FIELD

The present invention relates to a square secondary battery used, for example, in automotive application.

BACKGROUND ART

In recent years, development of square lithium secondary batteries of high energy density has proceeded as a power source for electric automobiles and the like. A square lithium ion secondary battery has an electrode group having a positive electrode and a negative electrode with a separator interposed therebetween. The electrode group is soaked with an electrolyte and housed within a battery case. Generally, the battery case is formed with an injection opening for injecting an electrolyte. The injection opening is sealed by a sealing cap after injection of the electrolyte, so that the battery case may tightly be sealed.

Patent Literature 1 discloses a sealed type battery. The structure described in Patent Literature 1 is formed as follows. A sealing cap having a pressure sensitive adhesive tape bonded to the lower surface of the sealing cap is fitted in a concave portion of an injection opening, whereby the upper surface of the concave portion of the injection opening and the bottom of the sealing cap are bonded by the pressure sensitive adhesive tape. The peripheral edge of the sealing cap is joined, by laser welding, to the battery case at the peripheral edge of the concave portion of the injection opening with the sealing cap secured temporarily.

PRIOR ART LITERATURE

Patent Literature

Patent Literature 1: JP-2011-34761-A

SUMMARY OF THE INVENTION

Problem to be Solved by the Invention

In the Patent Literature 1, the peripheral edge of the sealing cap is joined by laser welding to the battery case at the peripheral edge of the concave portion of the injection opening to seal the injection opening, thereby finally ensuring the seal of the battery case. In this configuration, a leakage test for inspecting leakage from the inside of the battery placed in a vacuum circumstance is an effective means as one of the methods of confirming the quality of sealability of the battery including each of welded portions in the final step of the battery manufacturing process.

However, in the configuration of the Patent Literature 1, since an annular pressure sensitive adhesive tape is bonded between the upper surface of a concave portion and the bottom of the sealing cap to surround the periphery of the injection opening, the space between the inside and the outside of the battery case is shielded by the pressure sensitive adhesive tape, resulting in the injection opening being sealed.

Accordingly, a fine pinhole that may lead to liquid leakage can be formed in the joined portion formed by the laser welding. In such a case, the fine pinhole will not be detected by a leakage test in the final step. However, it is considered that when the pressure sensitive adhesive of the pressure sensitive adhesive tape is eroded by an electrolyte with lapse of time and the sealing of the injection opening by the pressure sensitive adhesive tape is lost, liquid leakage may take place.

The present invention has been accomplished in view of the subject described above and it intends to provide a square secondary battery capable of suppressing occurrence of welding failure by provisionally securing a sealing cap and capable of detecting welding failure, even if it should occur, by a leakage test.

Means for Solving the Problem

For solving the subject described above, a square secondary battery of the present invention adopts a configuration, for example, described in the scope of the claim for patent. The present invention includes plural means for solving the subject described above and an example thereof is a square secondary battery which stores an electrode group in a battery case thereof, with the electrode group soaked with an electrolyte, the square secondary battery comprising: a case surface portion in which an injection opening for injecting the electrolyte is opened; a sealing cap disposed in facing relation to the case surface portion at a position to close the injection opening, the sealing cap being welded at an outer circumferential edge thereof to the case surface portion, thereby sealing the injection opening; a pressure sensitive adhesive member interposed between the sealing cap and the case surface portion for securing the sealing cap to the case surface portion; and a gas passage formed between the case surface portion and the sealing cap, the gas passage communicating the injection opening with a gap in a gas permeable manner, the gap being formed at an outer position with respect to the battery case than a position at which the pressure sensitive adhesive member is located.

Effects of Invention

According to the present invention, since the pressure sensitive adhesive member is interposed between the sealing cap and the case surface portion, the sealing cap can be secured provisionally to the case surface portion and the outer peripheral edge of the sealing cap can be welded stably when it is welded to the case surface portion and, since a gas passage is formed, between the case surface portion and the sealing cap, for communicating the gap formed at a position on the outer side with respect to the battery case than the pressure sensitive adhesive member with the injection opening in a gas permeable manner, welding failure if it should occur can be detected reliably in a leakage test. Subjects, constitutions, and advantages other than those described above will become apparent by the following description of the embodiments.

MODE FOR CARRYING OUT THE INVENTION

<First Embodiment>
[Entire Structure]

Figure 1:
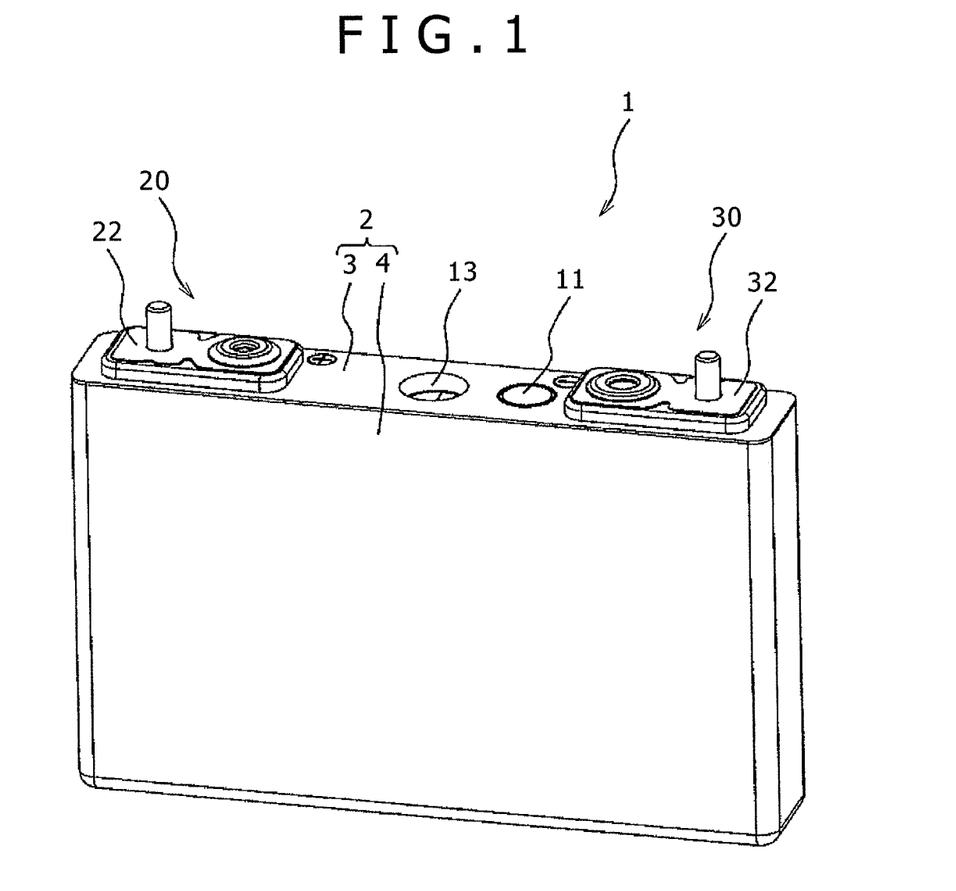
FIG. 1 is a perspective view illustrating an appearance of a square secondary battery in an embodiment.
Figure 2:
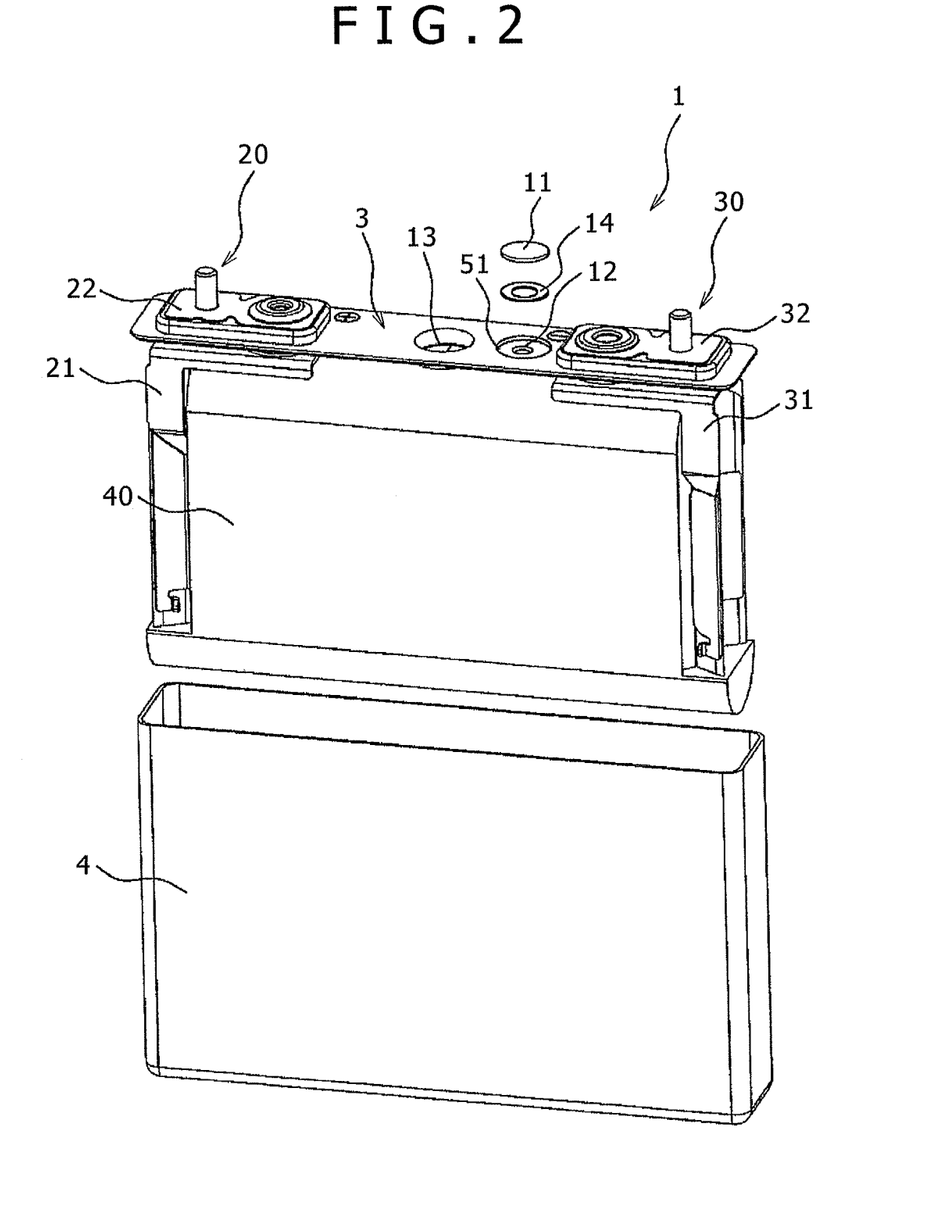
FIG. 2 is an exploded perspective view of the square secondary battery in FIG. 1.

FIG. 1 is a perspective view illustrating the appearance of a square secondary battery in this embodiment and FIG. 2 is an exploded perspective view of the square secondary battery illustrated in FIG. 1.

A square secondary battery 1 is a square lithium ion secondary battery used as a driving source, for example, of hybrid automobiles and electric automobiles, in which a wound electrode group 40 is housed in a thin substantially rectangular pallelepiped battery case 2 comprising a battery cover 3 and a battery can 4, and soaked with an injected non aqueous electrolyte not illustrated. The battery cover 3 and the battery can 4 are formed, for example, of aluminum, iron, or stainless steel.

A positive electrode terminal 20 having a positive electrode collector plate 21, an external positive electrode terminal 22, etc. and a negative electrode terminal 30 having a negative electrode collector plate 31, an external negative electrode 32, etc. are assembled integrally to the battery cover 3, and they are configured as a battery cover unit. The positive electrode collector plate 21 and the negative electrode collector plate 31 of the battery cover unit are joined to a positive electrode metal foil and a negative electrode metal foil of an electrode group 40 respectively, for example, by supersonic welding. Thus there are formed a battery cover power generation device covered by an insulation sheet (not illustrated) at the periphery excluding the cover and housed from an opening at the upper end of the battery can 4 into the battery can 4.

Figure 3:
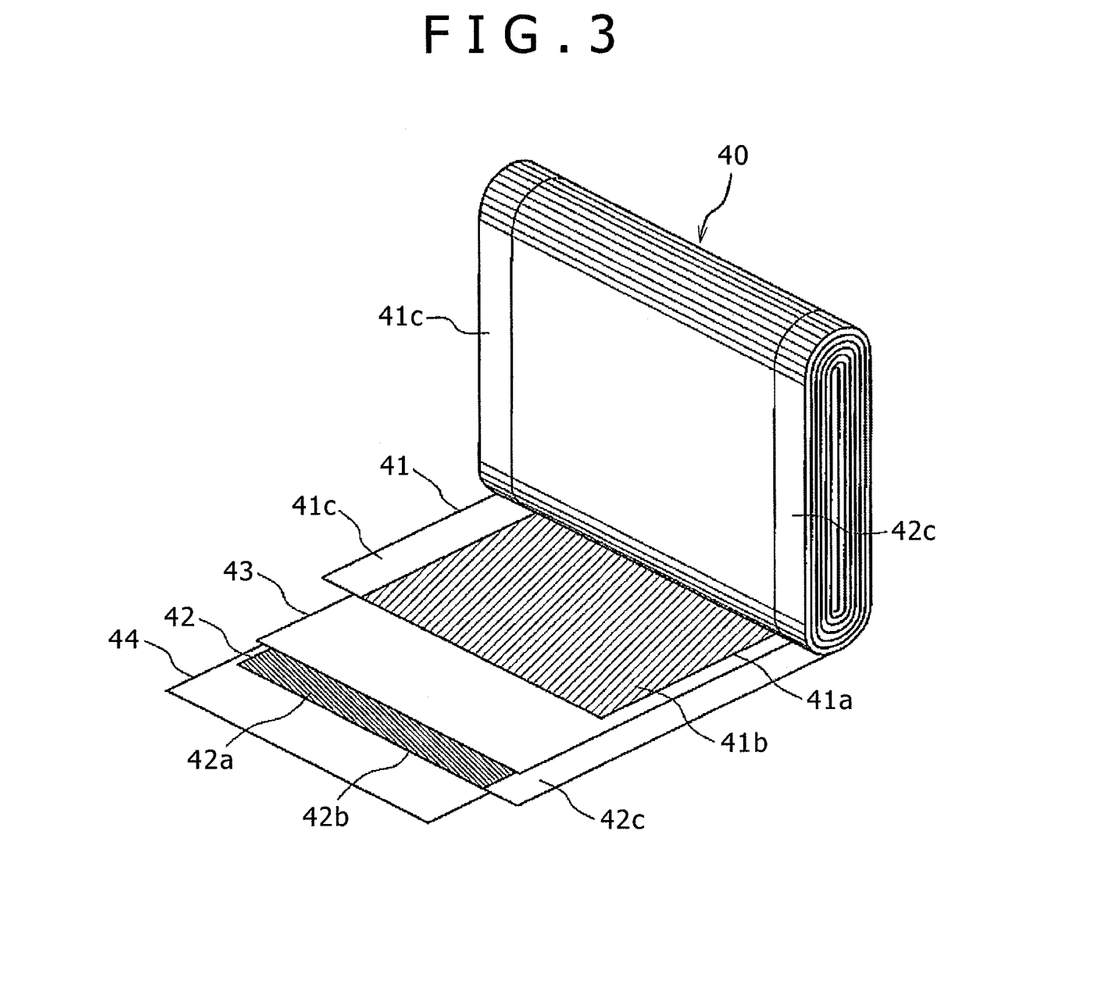
FIG. 3 is an exploded perspective view of a wound electrode group in the rectangular battery in FIG. 1.

FIG. 3 is an outer perspective view of an electrode group 40 which is developed on the winding end of the electrode group 40.

The wound electrode group 40 is formed by winding a positive electrode 41 and a negative electrode 42, with first and second separators 43 and 44 being interposed between them, in a flat shape around an axis not shown. The positive electrode 41 has a positive electrode metal foil 41a comprising, for example, an aluminum foil and a positive electrode mix layer 41b formed by coating a positive mix on both surfaces of the positive electrode metal foil 41a. The positive electrode mix layer 41b is coated so as to form a portion 41c not treated by positive electrode mix in which the positive electrode metal foil 41a is exposed on one side edge.

The negative electrode 42 has, for example, a negative electrode metal foil 42a comprising, for example, a copper foil and a negative electrode mix layer 42b formed by coating a negative electrode mix on both surface and rear face of the negative electrode metal foil 42a. The negative electrode mix layer 42b is coated so as to form a portion 42c not treated by negative electrode mix in which a negative electrode metal foil 42a is exposed on the lateral side.

The positive electrode mix layer 41b is prepared by adding 10 parts by weight of flaky graphite as an electrically conductive material and 10 parts by weight of polyvinylidene fluoride (hereinafter referred to as PVDF) as a binder based on 100 parts by weight of lithium manganate (chemical formula: $LiMn_2O_4$) as a positive electrode active material and adding N-methyl pyrrolidone(hereinafter referred to as NMP) as a dispersion solvent and kneading them. The positive electrode mix is coated on both surfaces of an aluminum foil of 20 μm thickness while a portion 41c not treated by positive electrode mix is left. Then, they are dried, pressed and cut to obtain a positive electrode 41 with a thickness of the positive electrode active material coating portion of 90 μm thickness (in total for both of the surface and the rear face) excluding the aluminum foil.

The negative electrode mix layer 42b is prepared by adding 10 parts by weight of PVDF as a binder based on 100 parts by weight of an amorphous carbon powder as a negative electrode active material and adding NMP as a dispersion solvent and kneading them. The negative electrode mix is coated on both surfaces of a copper foil of 10 μm thickness while a portion 42c not treated by negative electrode mix is left. Subsequently, they are dried, pressed and cut to obtain a negative electrode 42 of 70 μm thickness (in total for the surface and rear face) excluding the copper foil of the negative electrode active material.

When the electrode group 40 is formed, a winding start end of the negative electrode 42 and the winding start end of the positive electrode 41 are disposed respectively between first and second separators 43, 44 welded at the top ends to a not illustrated axis so that the former is at the inside of the latter and they are wound. In this case, the positive electrode 41 and the negative electrode 42 are disposed such that the portion 41c not treated by positive electrode mix and the portion 42c not treated by negative electrode mix are situated on lateral edges spaced apart each other in the lateral direction (in the direction of the winding axis). A width of the negative electrode mix layer 42b, that is, a length in the direction perpendicular to the winding direction is formed larger than the width of the positive electrode mix layer 41b. Further, the width of the first separator 43 has such a size that the portion 41c not treated by positive electrode mix of the positive electrode 41 is exposed outside at one side. The width of the second separator 44 is at such a size that the portion 42c not treated by negative electrode mix of negative electrode 42 is exposed to the outside at the other side edge.

As described above, in the wound electrode group 40, the portion 41c not treated by positive electrode mix of the positive electrode metal foil 41a is exposed to the outside in the positive electrode 41, while the portion 42c not treated by negative electrode mix of the negative electrode metal foil 42a is exposed to the outside in the negative electrode 42.

[Structure of Injection Opening and Sealing Cap]

Figure 4:
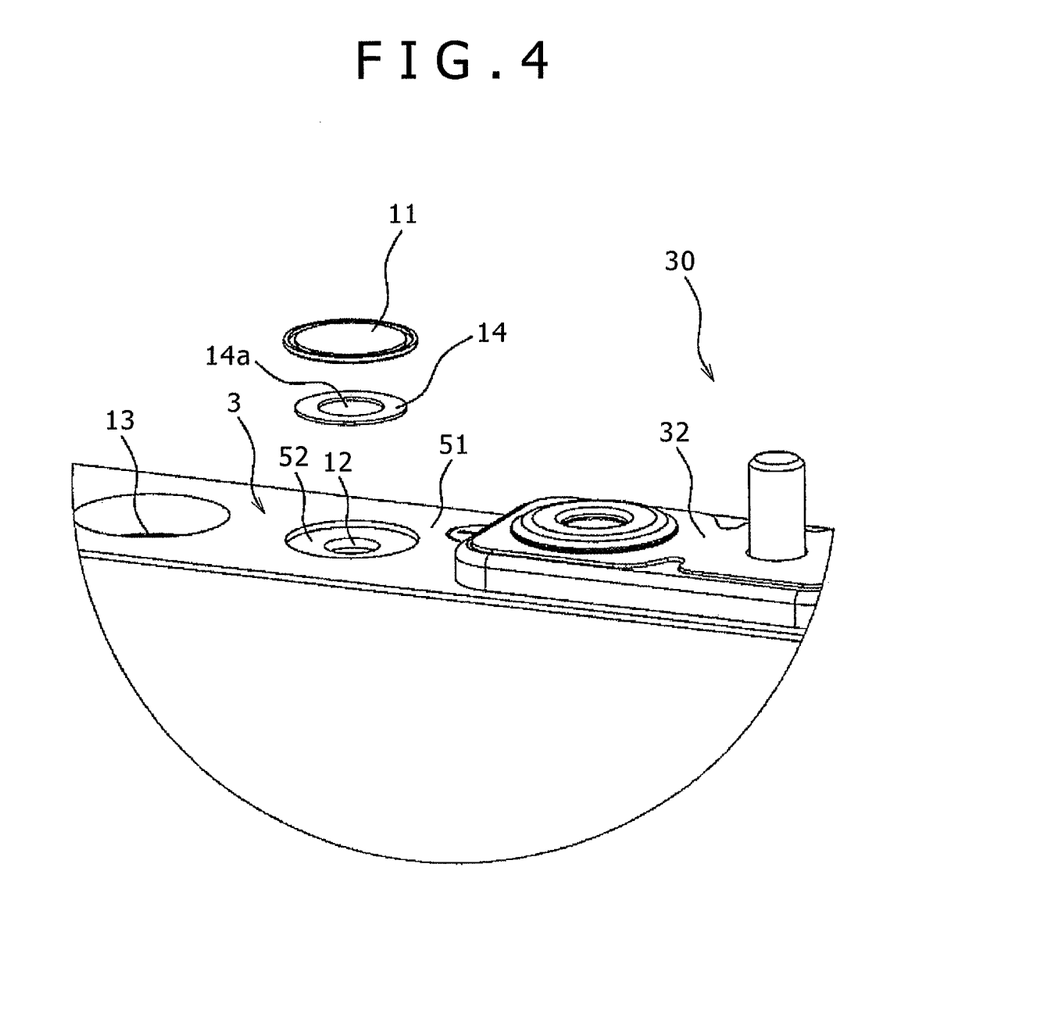
FIG. 4 is a fragmentary enlarged view for explaining a configuration of an injection opening and a sealing cap in a first embodiment.
Figure 5:
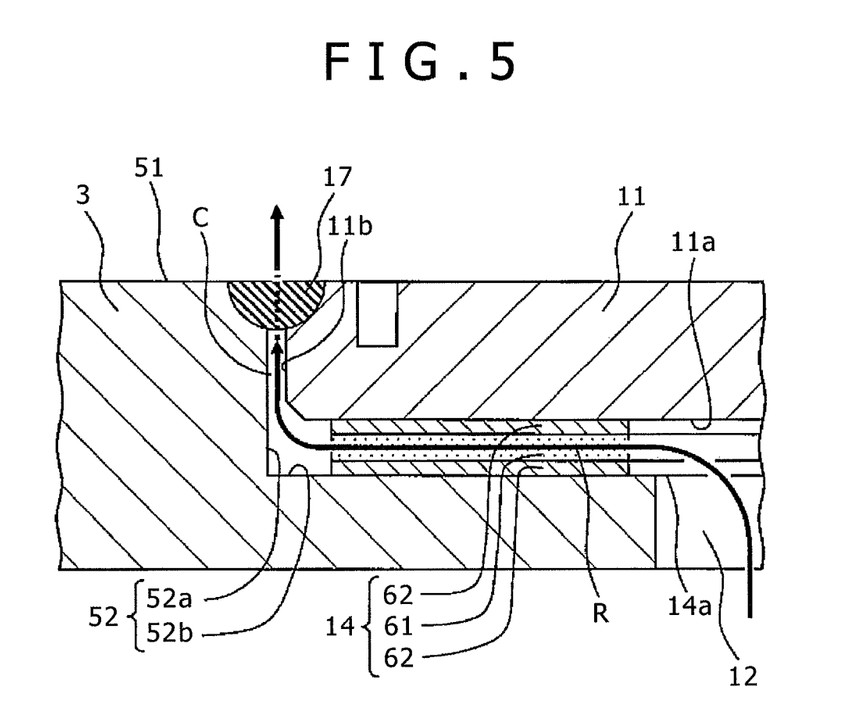
FIG. 5 is a view illustrating, in a cross section, a main portion of the configuration shown in FIG. 4.

FIG. 4 is a fragmentary enlarged view for explaining a configuration of an injection opening and a sealing cap in this embodiment and FIG. 5 is a view illustrating a main portion of the configuration shown in FIG. 4 along a cross section.

The square secondary battery 1 has a case surface portion 51 in which an injection opening 12 for injecting an electrolyte into the battery case 2 is opened, a sealing cap 11 disposed in facing relation to the case surface portion 51 at a position to close the injection opening 12, the sealing cap being welded at the outer circumferential edge to the case surface portion 51 for sealing the injection opening 12, and a pressure sensitive adhesive member 14 interposed between the sealing cap 11 and the case surface portion 51 for securing the sealing cap 11 to the case surface portion 51.

Then, as illustrated in FIG. 5, a gas passage R is formed between the case surface portion 51 and the sealing cap 11, the gas passage R communicating the injection opening 12 with a gap C in a gas permeable manner, the gap C being formed at an outer position with respect to the battery case 2 than a position at which the pressure sensitive adhesive member 14 is located. In this embodiment, the gas passage R is formed by imparting the pressure sensitive adhesive member 14 with the gas permeability.

As illustrated in FIG. 4, the battery case 2 has a concave portion 52 in the case surface portion 51 as an upper surface portion of the battery cover 3. The concave portion 52 has a substantially circular shape in a plan view and has an inner circumferential surface 52a at a right angle to the battery cover 3 and a bottom 52b in parallel with the battery cover 3 as illustrated in FIG. 5. The injection opening 12 is opened at the bottom 52b of the concave portion 52. The injection opening 12 is formed for injecting the non-aqueous electrolyte into the battery case 2 and extended through the battery cover 3. The injection opening 12 has a diameter smaller than that of the concave portion 52 and disposed at the center of the bottom 52b such that the bottom 52b is disposed in circumferential continuity to the periphery of the injection opening 12.

The sealing cap 11 is formed from a metal sheet by pressing. The sealing cap 11 has a disk-like shape which is fitted in the concave portion 52, opposed at the lower surface 11a to the bottom of the concave portion and opposed at the outer circumferential surface lib to the inner circumferential surface 52a of the concave portion 52. A double-sided tape 14 is adhered to the lower surface 11a of the sealing cap 11. The double-sided tape 14 is a pressure sensitive adhesive member interposed between the sealing cap 11 and the case surface portion 51 for securing the sealing cap 11 to the case surface portion 51. The double-sided tape 14 can prevent the sealing cap 11 from displacement and enables stable welding when the sealing cap 11 is welded to the case surface portion 51. The double-sided tape 14 is punched into an annular shape with an outer diameter somewhat smaller than that of the sealing cap 11. The double-sided tape 14 is bonded on one side to the lower surface 11a of the sealing cap 11.

As illustrated in FIG. 5, the double-sided tape 14 has a three-layered structure comprising a substrate 61 and pressure sensitive adhesive layers 62 formed by coating pressure sensitive adhesives on both sides of the substrate 61. The substrate 61a is formed of resin sheet comprising a porous film having gas permeability and water proofness. The material for the resin sheet comprising the porous film includes a polyolefinic resin such as polyethylene and polypropylene and a fluoro resin such as polytetrafluoroethylene. The gas permeability and the water proofness can be adjusted by changing a pore diameter, a thickness, and a porosity of the porous film.

The pressure sensitive adhesive layer 62 may be formed entirely on the surface of the substrate 61 or may be formed partially on the surface of the substrate 61. For the material of the pressure sensitive adhesive layer 62, a synthetic rubber material excellent in solvent resistance is optimal but an expensive acrylic material may also be used.

A circular punched portion 14a is formed in the radial central portion of the double-sided tape 14 at a position corresponding to a position just below the injection opening 12. The pressure sensitive adhesive layer 62 is disposed to the lower surface 11a of the sealing cap 11 except for a portion opposing to the injection opening 12.

The sealing cap 11 is fitted in the concave portion 52, in which the bottom 52b of the concave portion 52 and the lower surface 11a of the sealing cap 11 are opposed and the inner circumferential surface 52a of the concave portion 52 and the outer circumferential surface 11b of the sealing cap 11 are opposed each other. Then, the bottom 52b of the concave portion 52 and the lower surface 11a of the sealing cap 11 are adhered by the gas permeable double-sided tape 14, and a gap C formed between the circumferential surface 52a of the concave portion 52 and the outer circumferential surface 11b of the sealing cap 11 is communicated with the injection opening 12 in a gas permeable manner.

The sealing cap 11 is laser-welded between the upper end of the inner circumferential surface 52a of the concave portion 52 and the circumferential edge portion at the upper end of the sealing cap 11 over the entire circumference in a state in which the sealing cap 11 is secured to the battery cover 3 by the double-sided tape 14, thereby sealing the injection opening 12. Weld beads 17 are formed to the joined portion joined by the laser welding.

Procedures for sealing the injection opening 12 by the sealing cap 11 are described. Before sealing, the battery cover and the electrode group 40 as an electric generation device are inserted in the battery casing 4, the opening of the battery casing 4 is closed by the battery cover 3, and the battery casing 4 and the battery cover 3 are sealed by laser welding, followed by injection of a predetermined amount of a non-aqueous electrolyte from the injection opening 12 to the battery case 2. Lithium hexafluoro phosphate (LiPF$_6$) dissolved as a lithium salt by 1 mol/L in a mixed solvent of ethylene carbonate (EC) and dimethyl carbonate (DMC) at a 2:3 volume ratio can be used as the non-aqueous electrolyte, for example.

First, a releasable sheet of the double-sided tape 14 previously adhered to the lower surface 11a of the sealing cap 11 is peeled off. Then, the sealing cap 11 is fitted in the concave portion 52 and pressed onto the bottom 52b of the concave portion 52. Thus, the bottom 52b of the concave portion 52 and the lower surface 11a of the sealing cap 11 are bonded by the double-sided tape 14. Since the double-sided tape 14 has gas permeability, the gap C and the injection opening 12 are communicated with each other in a gas permeable manner. In such an adhered state, the upper surface of the sealing cap 11 is substantially flush with the upper surface of the battery cover 3. Then, the circumferential edge of the sealing cap 11 is laser welded to the inner circumferential surface 52a of the concave portion 52 to seal the injection opening 12 with the sealing cap 11.

According to the square secondary battery 1 of this embodiment, after injection of a non-aqueous electrolyte by a predetermined amount from the injection opening 12, the sealing cap 11 in which the double-sided tape 14 is adhered to the lower surface 11a is fitted in the concave portion 52 of the battery cover 3, and the bottom 52b of the concave portion 52 and the lower surface 11a of the sealing cap 11 are bonded and secured by the double-sided tape 14.

For example, if the sealing cap 11 is to be press-fitted and secured in the concave portion 52, there may be a worry that galling occurs in the press fit portion between mating parts and welding failure takes place upon laser welding of the portions in the next step. However, according to this embodiment, since the cap is fitted and secured by the double-sided tape 14, there is no worry of welding failure due to galling, and the assembling process can also be performed more easily.

For quality control of the battery 1, a leakage test is performed as a final step of the assembling process for checking whether the battery case 2 is completely sealed with without pinholes or whether there is any minute leakage from the inside of the battery.

According to the square secondary battery of this embodiment, since the double-sided tape 12 has gas permeability, the gap C formed between the inner circumferential surface 52a of the concave portion 52 and the outer circumferential surface 11b of the sealing cap 11, and the injection opening 12 are communicated each other in a gas permeable manner. Accordingly, even when the pinhole should occur at the joined portion due to welding failure upon laser welding of the circumferential edge of the sealing cap 11 to the circumferential edge of the concave portion of the battery cover 3, minute leakage can be detected easily by the leak test. Accordingly, it can be prevented that minute leakage caused by pinholes would otherwise not be detected by the leakage test, so that the products are shipped as they are. Leakage can also be prevented even if aging deterioration of adhesiveness of the double-sided tape occurs.

Further, in the step of manufacturing a lithium ion secondary battery, particularly a non-aqueous electrolyte secondary battery using carbon for the negative electrode, a non-aqueous electrolyte is sometimes injected into the battery case 2 containing the power generation element 40 upon manufacture and a preliminary charging for forming the lithium compound membrane on the surface of carbon is conducted.

In the preliminary charging, since a gas evolves in the process of forming a membrane on the surface of carbon, final sealing for the battery case 2 is applied generally after degasing. Since it is necessary to perform preliminary charging for degassing in a period of from injection of the non-aqueous electrolyte to final sealing of the battery case 2, the battery 1 is in a state where the portion of the injection opening 12 is opened and, even when the production step is performed in a dry circumstance, moisture tends to intrude to the non-aqueous electrolyte. This may possibly lead to deterioration of the battery performance.

On the contrary, in this embodiment, since the sealing cap 11 having the double-sided tape 14 bonded to the bottom is adhered to the battery cover 3 to close the injection opening 12 immediately after injection of the non-aqueous electrolyte, moisture intrusion can be prevented. The gas evolved inside the battery in the preliminary charging step can be released past the double-sided tape 14 to the outside, so that increase of the pressure inside the battery can be prevented. The amount of gas permeation can be adjusted depending on pore size, thickness, and porosity of the substrate for the porous film of the double-sided tape 14.

In the configuration described above, while description has been made to a case in which the substrate 61 is formed of the resin sheet comprising the porous film, the substrate may be formed also by other gas permeable materials. For example, the substrate 61 may be formed of a fibrous non-woven fabric. The amount of gas permeation can be adjusted depending on the density of the non-woven fabric or by the pressure sensitive adhesive entirely or partially coated on upper and lower surfaces thereof. The non-woven fabric used has a density, for example, of 25 g/m$^2$ to 50 g/m$^2$.

Forming the substrate of the double-sided tape 14 with the non-woven fabric allows easy adjustments of density and of the gas permeation amount of the gas passage R as compared with the resin sheet comprising the porous film. Further, if the electrolyte is slightly deposited and remains in the vicinity of the injection opening 12, this can be absorbed in the non-woven fabric. Accordingly, when the sealing cap 11 is laser-welded, an advantageous effect of preventing undesired effect of the remaining electrolyte on welding can also be expected.

The material for the substrate of the non-woven fabric includes, for example, a polyolefinic resin such as polyethylene and polypropylene and a fluoro resin such as polytetrafluoroethylene. As the material for the pressure sensitive adhesive material, a synthetic rubber excellent in solvent resistance is optimal but an inexpensive acrylic material can also be used.

<Second Embodiment>

Then, a second embodiment of the present invention is to be described below with reference to FIG. 6 and FIG. 7.

Figure 6:
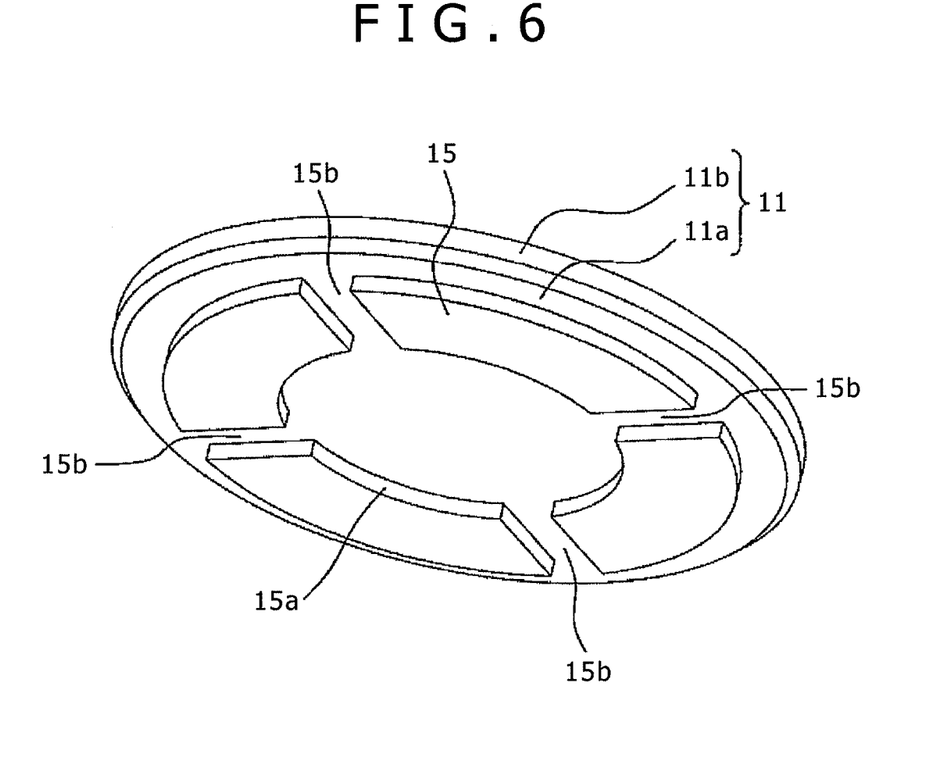
FIG. 6 is a perspective view for explaining a configurational example of a sealing cap and a double-sided tape in a second embodiment.
Figure 7:
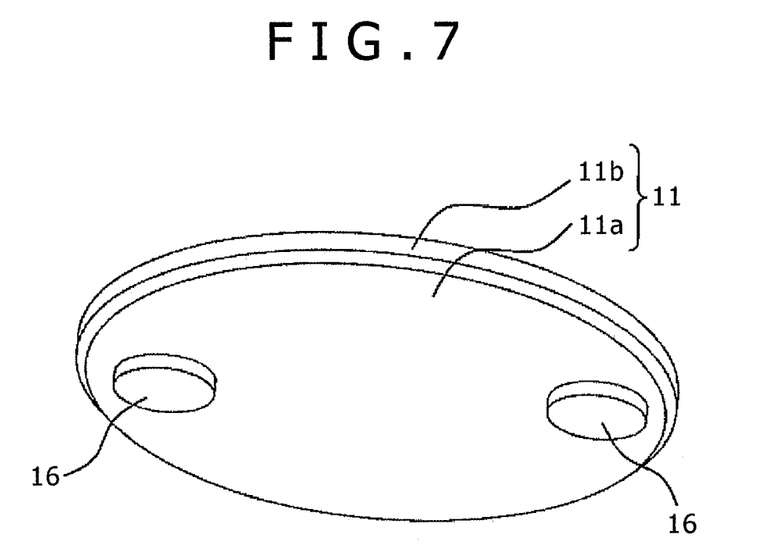
FIG. 7 is a perspective view for explaining another configurational example of a sealing cap and a double-sided tape in the second embodiment.

FIG. 6 is a perspective view for explaining a configurational example of a sealing cap and a double-sided tape in this embodiment and FIG. 7 is a perspective view explaining another configurational example of the sealing cap and the double-sided tape in this embodiment. Constituent elements identical with those of the first embodiment carry same reference signs, for which detailed descriptions are to be omitted.

A characteristic feature of this embodiment is that a double-sided tape 15 is adhered partially to the lower surface of the sealing cap 11 so as to communicate the gap C and the injection opening 12.

In the first embodiment described above, the annular double-sided tape 14 is adhered so as to circumferentially surround the periphery of the injection opening 12 that opens to the bottom 52b of the concave portion 52 in a circumferential direction with no clearance. In this embodiment, a double-sided tape 15 is disposed discontinuously in the circumferential direction as illustrated in FIG. 6, or a double-sided tape 16 disposed partially as illustrated in FIG. 7 is used.

The double-sided tape 15 illustrated in FIG. 6 is formed in an annular shape and a circular punched portion 15a is formed in a radially central portion. Then, recesses 15b are formed from the circular punched portion 15a to the circumferential edge at the radial outside. The number of the recesses 15b disposed is four with an equal circumferential distance in this embodiment, but it may be one or more and the number, the width, etc. can be set in accordance with the amount of gas permeation.

The double-sided tape 15 is adhered to the lower surface 11a of the sealing cap 11 and the sealing cap 11 is fitted in the concave portion 52 and secured to the battery cover 3. A clearance is formed which corresponds to the thickness of the double-sided tape 15 at the recesses 15b of the double-sided tape 15, thereby allowing gas permeation between the gap C and the injection opening 12.

Further, double-sided tapes 16 illustrated in FIG. 7 are provided in plurality, by the number of two in this embodiment, at a predetermined circumferential interval at the lower surface 11a but at positions opposing the bottom 52b of the concave portion 52 of the sealing cap 11. The number of the double-sided tapes 16 may be of any number so long as the sealing cap 11 can be secured stably and allows gas permeation from the radial center to the circumferential edge at the radial outside.

The double-sided tape 16 is adhered to the lower surface 11a of the sealing cap 11, and the sealing cap 11 is fitted in the concave portion 52 and secured to the battery cover 3. A clearance is formed which corresponds to the thickness of the double-sided tape 16 between the lower surface 11a of the sealing cap 11 and the bottom 52b of the concave portion 52 at a portion where the double-sided tape 16 is not adhered, thereby allowing gas permeation between the gap C and the injection opening 12.

Accordingly, the sealing cap 11 can be secured to the battery cover 3 and, further, leakage can be detected by the leakage test in a final step. This is optimal particularly in a case where a higher gas permeability is necessary than the gas permeability obtained by the configuration of the first embodiment. Further, in this embodiment, it is not necessary that the double-sided tapes 15 and 16 per se have a gas permeability as in the double-sided tape 14 of the first embodiment. Accordingly, as compared with the first embodiment, the double-sided tape 14 for general purpose use can be used; thus a wide variety of selection for the double-sided tape can be offered. Further, a pressure sensitive adhesive sheet consisting only of a pressure sensitive adhesive can also be used instead of the double-sided tape of the 3-layered structure.

<Third Embodiment>

Then, a third embodiment of the present invention will be described below with reference to FIG. 8 and FIG. 9.

Figure 8:
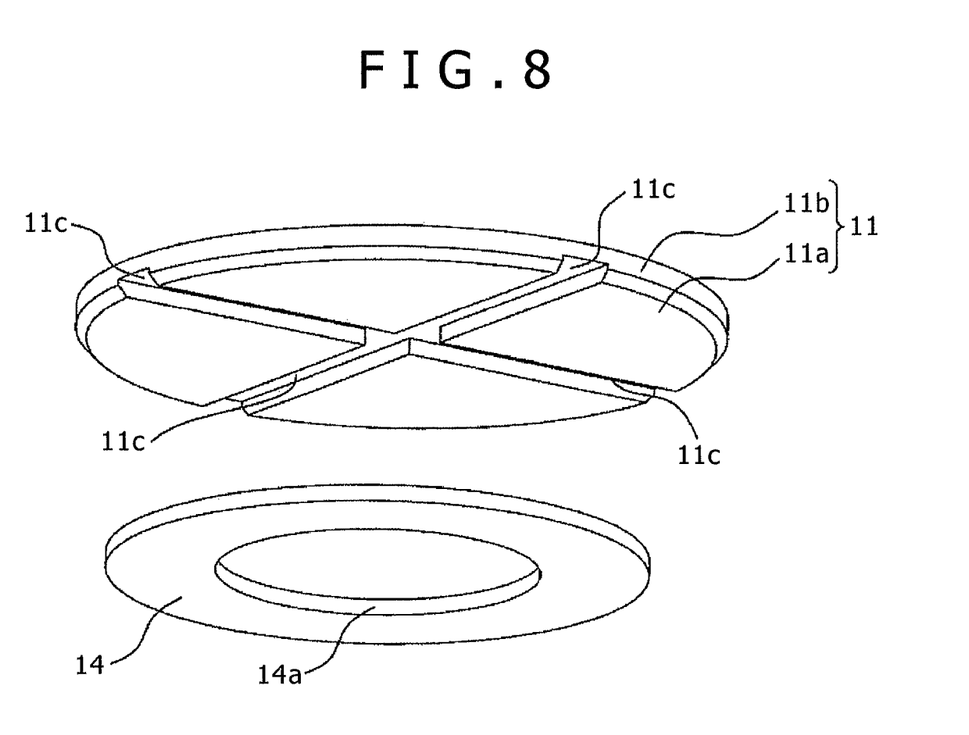
FIG. 8 is a perspective view for explaining a configurational example of a sealing cap and a double-sided tape in a third embodiment.
Figure 9:
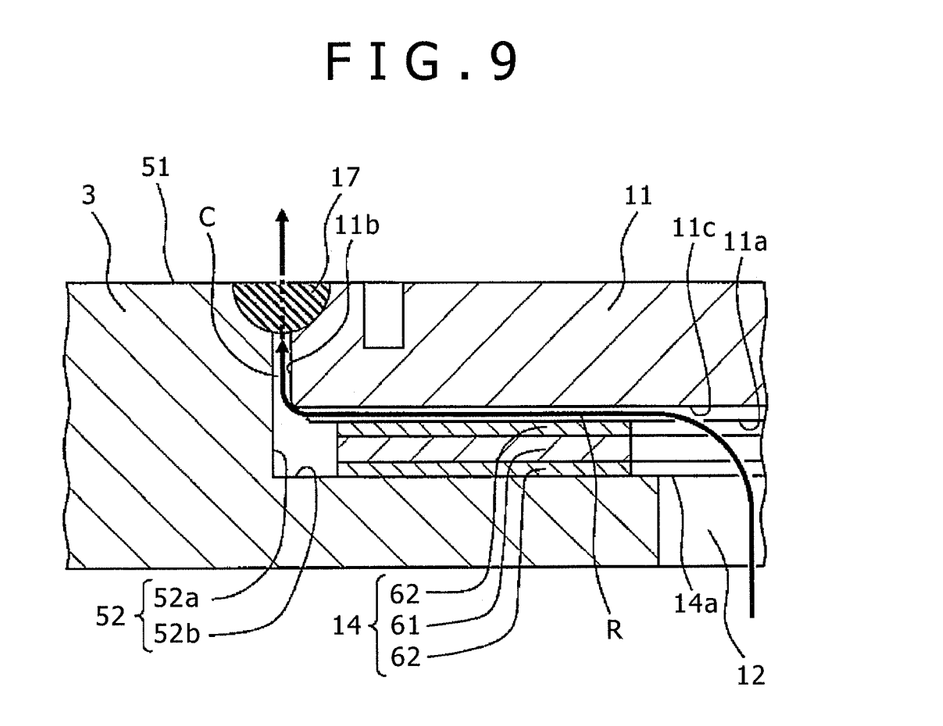
FIG. 9 is a cross sectional view illustrating a state in which the injection opening is sealed with the sealing cap in the third embodiment.

FIG. 8 is a perspective view for explaining a configurational example of a sealing cap and a double-sided tape in this embodiment, and FIG. 9 is a cross sectional view illustrating a state in which an injection opening is sealed with a sealing cap in this embodiment. Constitutional elements identical with those of the first and the second embodiments described above carry same reference signs, for which detailed descriptions are to be omitted.

The characteristic feature of this embodiment is that first grooves 11c that extend between the gap C and the injection opening are disposed at the lower surface 11a of the sealing cap 11.

The sealing cap 11 is formed with the first grooves 11c at the lower surface 11a. The first grooves 11c are extended past the radial center of the lower surface 11a diametrically from one end to the other end. In this embodiment, two first grooves 11c are formed crosswise. The number of the first grooves 11c is not restricted to two but it may be one or three or more, and the number is determined depending on the amount of gas permeation.

The double-sided tape 14 is adhered to the lower surface 11a of the sealing cap 11, and the sealing cap 11 is fitted in the concave portion 52 and secured to the battery cover 3. A clearance is formed which corresponds to the thickness of the first groove 11c between the first groove 11c at the lower surface 11a of the sealing cap 11 and the double-sided tape 14, thereby allowing gas permeation between the gap C and the injection opening 12 through a gas passage R.

Accordingly, the sealing cap 11 can be secured to the battery cover 3, and leakage can be detected by a leakage test in the final step. This is optimal particularly in a case where a higher gas permeability is necessary than the permeability obtained by the configuration of the first embodiment. Further, it is not necessary in this embodiment that the double-sided tape 14 per se has gas permeability as in the first embodiment. Accordingly, as compared with the first embodiment, the double-sided tape for general purpose use can be used; thus a wide variety of selection for the double-sided tape can be offered. Further, the double-sided tape used may be a pressure sensitive adhesive sheet of the three-layered structure but also a pressure sensitive adhesive sheet only consisting of the pressure sensitive adhesive. Further, in this embodiment, since the bottom 52b of the concave portion 52 is flat, the electrolyte, if deposited, can be wiped off easily and can be removed simply before welding.

<Fourth Embodiment>

Figure 10:
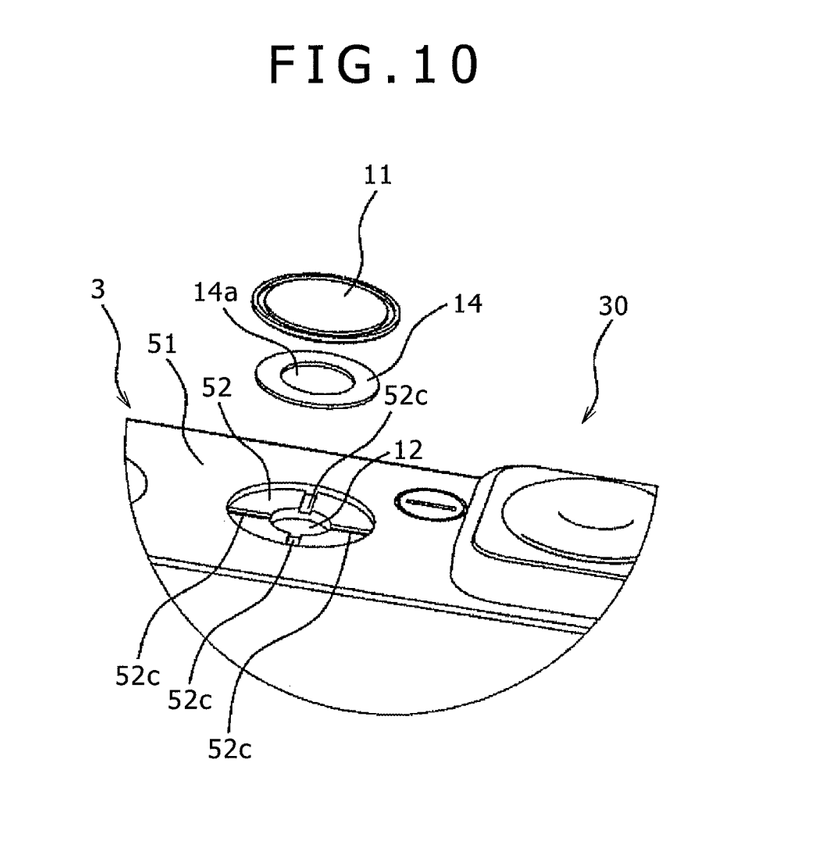
FIG. 10 is a perspective view for explaining a configurational example of a sealing cap and a double-sided tape in a fourth embodiment.
Figure 11:
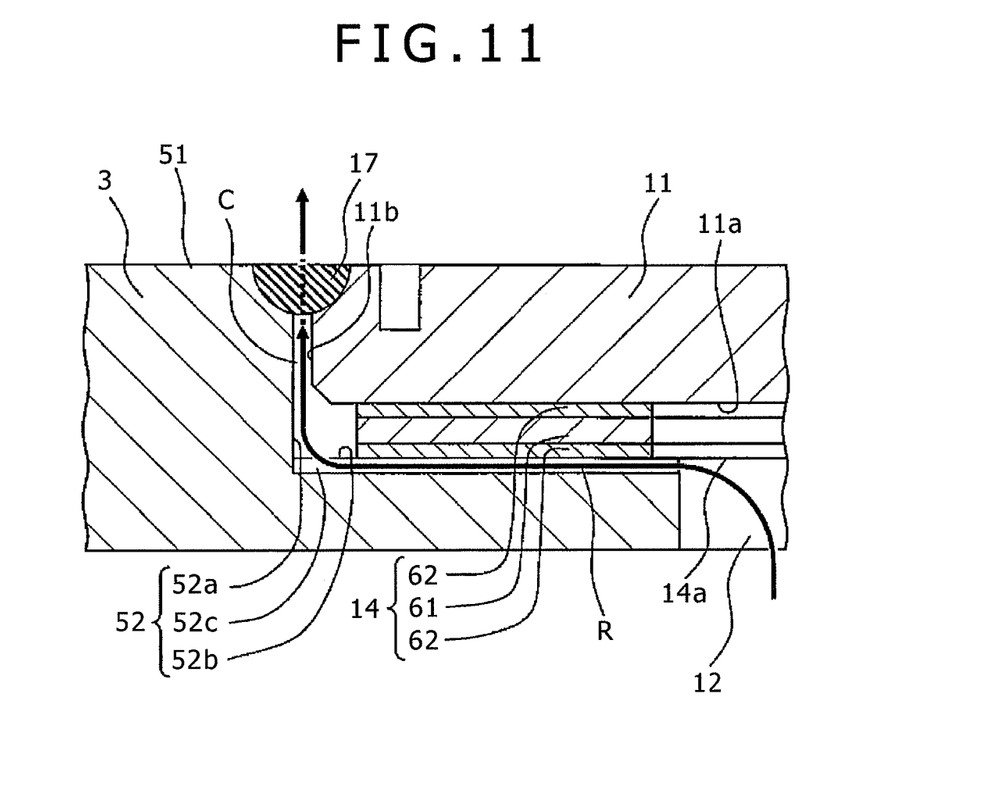
FIG. 11 is a cross sectional view illustrating a state in which the injection opening is sealed with the sealing cap in the fourth embodiment.

Then, a fourth embodiment of the present invention is to be described below with reference to FIG. 10 and FIG. 11. FIG. 10 is a perspective view for explaining a configurational example of a sealing cap and a double-sided tape in this embodiment and FIG. 11 is a cross sectional view illustrating a state in which an injection opening is sealed with a sealing cap in this embodiment. Constitutional elements identical with those in the first to third embodiments described above carry same reference signs, for which duplicate descriptions are to be omitted.

The characteristic feature in this embodiment is that second grooves 52c extending between a gap C and an injection opening 12 are provided in a bottom 52b of a concave portion 52.

The second grooves 52c are provided in the bottom 52b of the concave portion 52. The second grooves 52c are extended to the inner circumferential surface 52a from the radial center of the bottom 52b toward the radial outside. In this embodiment four second grooves 52c are disposed each at a 90° angular relation to each other. The number of the second grooves 52c is not restricted to four but the number may be one or two or more and determined in accordance with the amount of gas permeation.

A double-sided tape 14 is bonded to a lower surface 11a of a sealing cap 11 and the sealing cap 11 is fitted in the concave portion 52 and secured to a battery cover 3. A clearance is formed which corresponds to the thickness of the second groove 52c between the second grooves 52c in the bottom 52b of the concave portion 52 and the double-sided tape 14, thereby allowing gas permeation between the gap C and the injection opening 12 through the gas passage R.

Accordingly, the sealing cap 11 can be secured to the battery cover 3, and leakage can be detected by the leakage test in the final step. This is optimal particularly in a case where a higher gas permeability is necessary than the permeability obtained by the configuration of the first embodiment. Further, in this embodiment, it is not necessary that the double-sided tape 14 per se has a gas permeability as in the first embodiment. Accordingly, as compared with the first embodiment, the double-sided tape for general-purpose use can be used; thus a wide variety of selection for the double-sided tape can be offered. Further, the double-sided tape is not restricted to the three-layered structure but also a pressure sensitive adhesive sheet only consisting of a pressure sensitive adhesive can also be used.

According to the square secondary battery 1 of the present invention, since the pressure sensitive adhesive member 14 is interposed between the sealing cap 11 and the concave portion 52 upon sealing of the injection opening 12, the sealing cap 11 is temporarily secured when the circumferential edge of the sealing cap 11 is joined to the circumferential edge of the concave portion 52 by laser welding. Accordingly, welding is stabilized. In addition, since a gas passage R connecting the gap C and the injection opening 12 is present between the bottom 52b of the concave portion 52 of the injection opening 12 and the lower surface 11a of the sealing cap 11, even when welding failure should occur, it can be detected reliably by a leakage test.

While the present invention has been described specifically with reference to the embodiments, the invention is not restricted to the embodiments described above but various design changes can be adopted within a range not departing the split of the present invention described in the scope of the claim for patent. For example, the foregoing embodiments are only meant to be illustrative, and the invention is not necessarily limited to structures having all the components disclosed. For instance, part of the components of one embodiment can be replaced by part of the components of another, or part of the components of one embodiment can be added to the components of another. Further, each of the foregoing embodiments allows addition, removal, and replacement of certain components.

DESCRIPTION OF REFERENCE CHARACTERS

1 Square secondary battery
2 Battery case
3 Battery cover
4 Battery can
11 Sealing cap
11a Lower surface
11b Outer circumferential surface
12 Injection opening
13 Safety valve
14, 15, 16 Double-sided tape (pressure sensitive adhesive member)
14a Punched portion
21 Positive electrode collector plate
31 Negative electrode collector plate
40 Electrode group
51 Case surface portion
51 Concave portion
52a Inner circumferential surface
52B Bottom
52c Second groove
61 Substrate
62 Pressure sensitive adhesive layer
R Gas passage
C Gap

The invention claimed is:

1. A square secondary battery which stores an electrode group in a battery case thereof, with the electrode group soaked with an electrolyte, the square secondary battery comprising:
   a case surface portion in which an injection opening for injecting the electrolyte into the battery case is opened;
   a sealing cap disposed in facing relation to the case surface portion at a position to close the injection opening, the sealing cap being welded at an outer circumferential edge thereof to the case surface portion, thereby sealing the injection opening;
   a pressure sensitive adhesive member interposed between the sealing cap and the case surface portion for securing the sealing cap to the case surface portion; and a gas passage formed between the case surface portion and the sealing cap, the gas passage communicating the injection opening with a gap in a gas permeable manner, the gap is positioned between the battery case and the sealing cap and downstream of the pressure sensitive adhesive member,
   wherein the pressure sensitive adhesive member is formed of double-sided tape adhered on both surfaces of a substrate wherein the substrate comprises a gas permeable layer that forms the gas passage.

2. The square secondary battery according to claim 1, wherein the substrate of the double-sided tape comprises a porous film or a non-woven fabric.

3. The square secondary battery according to claim 1, wherein the double-sided tape has a recess continuously recessed between the gap and the injection opening.

4. The square secondary battery according to claim 1, wherein the pressure sensitive adhesive member is disposed intermittently at the periphery of the injection opening.

* * * * *